Feb. 14, 1961  S. S. ROBERTS  2,971,399
TELESCOPIC PROTECTOR
Filed May 27, 1959  2 Sheets-Sheet 2
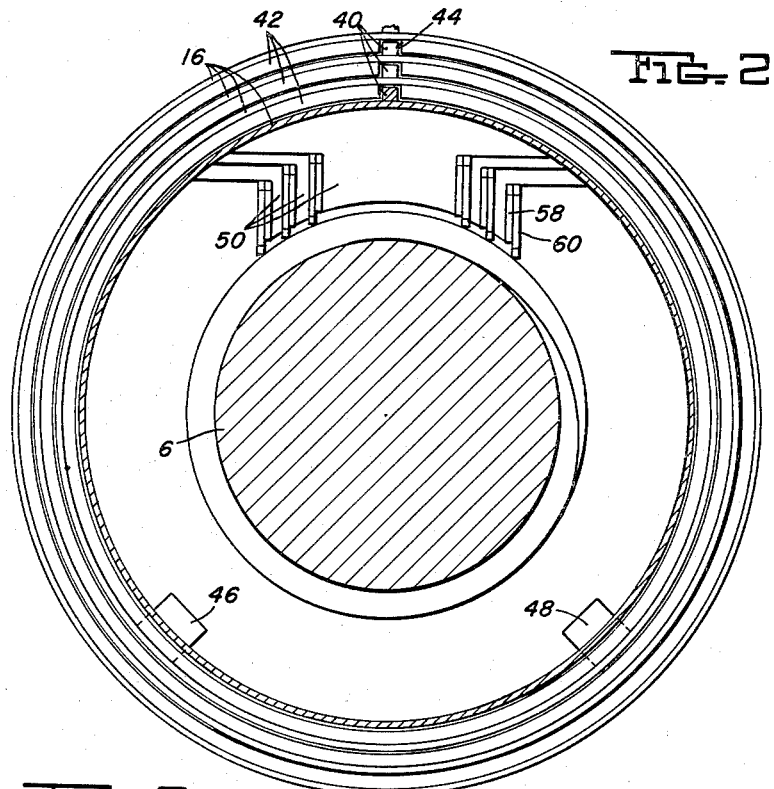
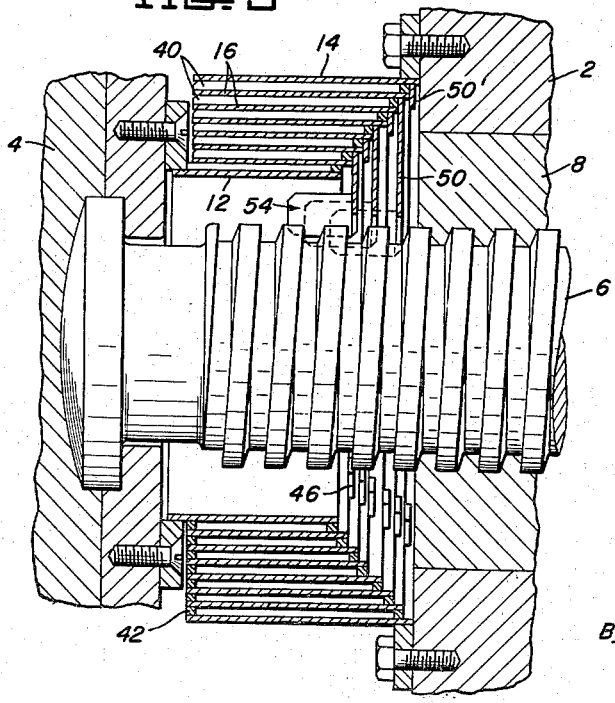
INVENTOR
SAMUEL S. ROBERTS
By Martin J. Carroll
Attorney 2,971,399
Patented Feb. 14, 1961

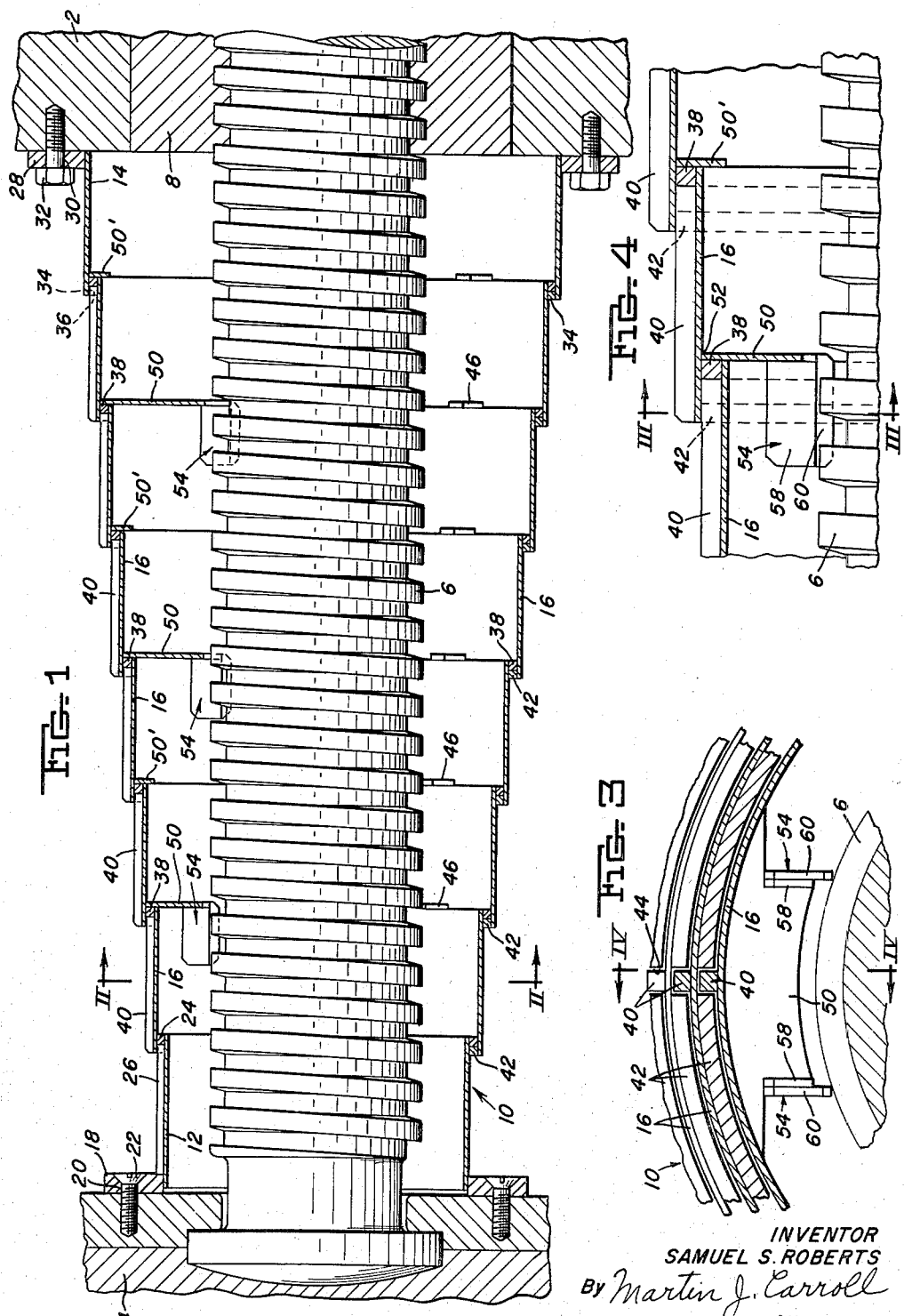

2,971,399
TELESCOPIC PROTECTOR

Samuel S. Roberts, Pittsburgh, Pa., assignor to McGraw-Edison Company, a corporation of Delaware Filed May 27, 1959, Ser. No. 816,225

8 Claims. (Cl. 74—609)

This invention relates to a telescopic protector for traversing shafts or screws such as shown in my prior Patent No. 2,514,721, dated July 11, 1950. The prior protectors have various disadvantages. For example, in the protectors of my prior patents the individual rings can rotate with respect to one another unless a complicated structure is used outside the protector. This structure is expensive, subject to damage, and collects dirt. Without means to prevent rotation of the rings damage to the protector sometimes occurred due to misalignment of parts. The rings sometimes cock with respect to one another as they telescope together.

It is therefore an object of my invention to provide a telescopic protector having simple means to keep its rings from rotating one with respect to the others.

Another object is to provide such a protector which may be used in any position without the use of complicated exterior supports.

Still another object is to provide such a protector in which the rings are maintained in uniform alignment throughout its traverse.

A further object is to provide such a protector which is self-cleaning and which is free of parts which collect dust and the like.

These and other objects will be more apparent after referring to the following specification and attached drawings, in which:

Figure 1 is a longitudinal view of my protector in place in expanded position;

Figure 2 is a view on a larger scale taken on the line II—II of Figure 1;

Figure 3 is a view on a larger scale taken on the line III—III of Figure 4;

Figure 4 is a view on a larger scale taken on the line IV—IV of Figure 3 showing the protector in partially collapsed position; and Figure 5 is a view, similar to Figure 1, of a slight modification showing the protector in nested position.

Referring more particularly to the drawings, reference numerals 2 and 4 indicate two relatively movable parts with a shaft or screw 6 extending therebetween. The parts 2 and 4 may be incorporated in a machine of any type. For example, the part 2 may be a roll housing for supporting a nut 8 into which screw 6 is threaded and the part 4 may be a bearing chock which is attached to the end of screw 6 for movement toward and away from the housing 2. My improved protector 10 extends between and is fastened to the parts 2 and 4. The protector 10 is made up of a plurality of overlapping rings 12, 14 and 16 which increase in diameter from the end adjacent part 4 to the end adjacent part 2. The left end of ring 12, as shown in Figure 1, is provided with an outwardly extending anchorage plate 18 having a plurality of holes 20 therein for receiving screws 22 which are threaded into part 4. An annulus 24, having a substantially square cross section, is welded to the outside of the underlapping end of ring 12, thus forming a flange having an outer diameter substantially equal to the inside diameter of the associated overlapping ring 16. A longitudinal key 26 is welded to the top of the outside of ring 12. The right end of ring 14, as shown in Figure 1, is provided with an outwardly extending anchorage plate 28 having a plurality of holes 30 therein for receiving cap screws 32 which are threaded into part 2. An annulus 34 having a substantially square cross section, is welded to the inside of the overlapping end of ring 14, thus forming a flange having an inner diameter substantially equal to the outside diameter of the associated underlapping ring 16. A keyway 36 is provided in the annulus 34 at the top of the protector 10. The reference numeral 16 is applied to each of the intermediate rings since their construction and operation, except for size, are essentially alike. The width of the rings 16 preferably increases uniformly from the small to large diameter rings as shown in Figure 5 to enable them to be closely nested. An annulus 38, having a substantially square cross section is welded to the underlapping end of each ring 16, thus forming a flange having an outer diameter substantially equal to the inside diameter of the associated overlapping ring. A longitudinal key 40 is welded to the top of the outside of each ring 16. An annulus 42, having a substantially square cross section, is welded to the inside of the overlapping end of each ring 16, thus forming a flange having an inner diameter substantially equal to the outside diameter of the associated underlapping ring. A keyway 44 is provided in the annulus 42 at the top of the protector 10. While the keys 26 and 40 and the keyways 36 and 44 are all preferably in alignment, as shown, it is only necessary that the key of the underlapping ring be in alignment with the keyway of the associated overlapping ring. This key and keyway arrangement is an important part of the present invention since it prevents the rings from rotating one with respect to the others. For the purpose of illustration the keys and keyways are shown in Figure 1 as though the view were taken on a line corresponding to line IV—IV of Figure 3 instead of the keys being shown in section. Each of the rings 16 has a set of three inwardly extending flanges 46, 48 and 50 fastened to its underlapping end. The flanges 46, 48 and 50 may be fastened directly to the rings 16, but are preferably fastened to the rings 16 through the annulus 38. The flanges 46 and 48 are preferably arranged on opposite sides of the bottom of the ring 16, each about 45° from the bottom thereof. The flanges 46 and 48, in conjunction with flanges 50, prevent the rings from cocking as they are telescoped together. The flanges 46 and 48 are in the form of steel bars about one inch wide, 1/16 inch thick and of such length that they extend inwardly to a radius substantially equal to the inner radius of the next smaller ring. The flanges 50 are preferably shaped as best shown in Figures 3 and 4. As there shown the flange 50 has an arcuate outer surface 52 of essentially the same radius as the associated annulus 38. A guide 54 is provided at the lower end of the flange 50 and is preferably formed as shown. The guide 54 includes two spaced flanges 58 extending parallel to the axis of the shaft 6 and a brass bar 60 fastened to each flange 58 to provide a better bearing surface. If the shaft 6 is threaded, the length of flanges 58 must be longer than the pitch of the threads. The flanges 58 of each guide should face in the same direction with the distance between the flanges varying from one end of the protector to the other with the distance being the least at the end toward which the flanges 58 face. As shown in Figure 1 the flanges at the left are closer together than at the right end. Also, the closer the flanges 58 are spaced the less they extend downwardly or inwardly toward the shaft 6 since they will rest on the shaft 6 closer to the top thereof. Preferably each alternate ring 16 is provided with a flange 50', similar to flanges 46 and 48, in place of flange 50. While the rings 12, 14 and 16 are shown as completely circular they may be a portion of a circle and it is in this sense that the terms rings and annuli are used. Also, while the shaft 6 and protector 10 are shown in a horizontal position they may be arranged in any plane. If desired, flanges 50 and guides 54 may be used in place of flanges 46 and 48 when the protector is arranged vertically, so as to insure centering of the protector on the shaft 6.

The operation of my device is as follows: As the parts 2 and 4 approach each other the rings telescope over one another with the guides 54 sliding over the shaft 6 and the keys 40 preventing rotation of the rings 16 so that the guides 54 can also telescope over one another. The flanges or stop guides 46 and 48 in combination with flanges 50 or 50' maintain uniform protector alignment throughout its traverse and prevent over travel of the rings. The rings 16 can telescope together until they reach the nested position shown in Figure 5.

While one embodiment of my invention has been shown and described, it will be apparent that other adaptations and modifications may be made without departing from the scope of the following claims.

I claim:

1. A telescopic protector for traversing screws and the like comprising a plurality of overlapping rings which progressively decrease in diameter from one end of the protector to the other end, an inwardly extending flange on the overlapping end of each ring, the inner diameter of said flange being substantially equal to the outside diameter of the next succeeding smaller ring, an outwardly extending flange on the underlapping end of each ring, said outwardly extending flange having an outer diameter substantially equal to the inner diameter of the next succeeding larger ring, a keyway in each inwardly extending flange, a key fastened to the outer surface of each ring parallel to its axis and adapted to be received in the keyway of the associated overlapping ring, an inwardly extending flange fastened to the underlapping end of each ring, each of said last named flanges extending inwardly beyond its associated ring, at least part of said last named flanges having a guide at its inner end bearing on said screw.

2. A telescopic protector for traversing screws and the like comprising a plurality of overlapping rings which progressively decrease in diameter from one end of the protector to the other end, an inwardly extending flange on the overlapping end of each ring, the inner diameter of said flange being substantially equal to the outside diameter of the next succeeding smaller ring, an outwardly extending flange on the underlapping end of each ring, said outwardly extending flange having an outer diameter substantially equal to the inner diameter of the next succeeding larger ring, a keyway in each inwardly extending flange, a key fastened to the outer surface of each ring parallel to its axis and adapted to be received in the keyway of the associated overlapping ring, an inwardly extending flange fastened to the underlapping end of each ring, each of said last named flanges extending inwardly beyond its associated ring, at least part of said last named flanges having a guide at its inner end, said last named guide including a pair of spaced flanges extending parallel to the axis of said screw and having a length greater than the pitch of the screw thread, said pairs of flanges bearing on said screw, the distance between the flanges of each pair varying from one end of the protector to the other with the distance being the least at the end toward which the pairs of flanges face.

3. A telescopic protector for traversing screws and the like comprising a plurality of overlapping rings which progressively decrease in diameter from one end of the protector to the other end, an inwardly extending flange on the overlapping end of each ring, the inner diameter of said flange being substantially equal to the outside diameter of the next succeeding smaller ring, an outwardly extending flange on the underlapping end of each ring, said outwardly extending flange having an outer diameter substantially equal to the inner diameter of the next succeeding larger ring, a keyway in each inwardly extending flange, a key fastened to the outer surface of each ring parallel to its axis and adapted to be received in the keyway of the associated overlapping ring, and a set of three inwardly extending flanges fastened to the underlapping end of each ring, said last named flanges extending inwardly beyond their associated rings and being spaced apart around the periphery thereof with the flanges of each set being aligned with the flanges of the other sets, at least part of the aligned flanges in one row having guides at their inner ends, said last named guide including a pair of spaced flanges extending parallel to the axis of said screw and having a length greater than the pitch of the screw thread, said pairs of flanges bearing on said screw, the distance between the flanges of each pair varying from one end of the protector to the other with the distance being the least at the end toward which the pairs of flanges face.

4. A horizontal telescopic protector for traversing screws and the like extending between relatively movable parts comprising a plurality of overlapping rings which progressively decrease in diameter from one end of the protector to the other end, an inwardly extending flange on the overlapping end of each ring, the inner diameter of said flange being substantially equal to the outside diameter of the next succeeding smaller ring, an outwardly extending flange on the underlapping end of each ring, said outwardly extending flange having an outer diameter substantially equal to the inner diameter of the next succeeding larger ring, a keyway in each inwardly extending flange, a key fastened to the outer surface of each ring parallel to its axis and adapted to be received in the keyway of the associated overlapping ring, an inwardly extending flange fastened to the underlapping end of each ring, said last named flanges extending inwardly beyond the associated ring and being in alignment at the top of the protector, and a guide at the lower end of at least part of said last named flanges bearing on said screw.

5. A horizontal telescopic protector for traversing screws and the like extending between relatively movable parts comprising a plurality of overlapping rings which progressively decrease in diameter from one end of the protector to the other end, an inwardly extending flange on the overlapping end of each ring, the inner diameter of said flange being substantially equal to the outside diameter of the next succeeding smaller ring, an outwardly extending flange on the underlapping end of each ring, said outwardly extending flange having an outer diameter substantially equal to the inner diameter of the next succeeding larger ring, a keyway in each inwardly extending flange, a key fastened to the outer surface of each ring parallel to its axis and adapted to be received in the keyway of the associated overlapping ring, an inwardly extending flange fastened to the underlapping end of each ring, said last named flanges extending inwardly beyond the associated ring and being in alignment at the top of the protector, and a guide at the lower end of at least part of said last named flanges, said last named guide including a pair of spaced flanges extending parallel to the axis of said screw and having a length greater than the pitch of the screw thread, said pairs of flanges bearing on said screw, the distance between the flanges of each pair varying from one end of the protector to the other with the distance being the least at the end toward which the pairs of flanges face.

6. A horizontal telescopic protector for traversing screws and the like extending between relatively movable parts comprising a plurality of overlapping rings which progressively decrease in diameter from one end of the protector to the other end, an inwardly extending flange on the overlapping end of each ring, the inner diameter of said flange being substantially equal to the outside diameter of the next succeeding smaller ring, an outwardly extending flange on the underlapping end of each ring, said outwardly extending flange having an outer diameter substantially equal to the inner diameter of the next succeeding larger ring, a keyway in each inwardly extending flange, said keyways being in alignment with each other at the top of said rings, a key fastened to the outer surface of each ring parallel to its axis and adapted to be received in the keyway of the associated overlapping ring, a set of three inwardly extending flanges fastened to the underlapping end of each ring, said last named flanges extending inwardly beyond their associated rings and being spaced apart around the periphery thereof with one of each set being at the top of said rings, at least part of said top flanges having a guide at its lower end, said last named guide including a pair of spaced flanges extending parallel to the axis of said screw and having a length greater than the pitch of the screw thread, said pairs of flanges bearing on said screw, the distance between the flanges of each pair varying from one end of the protector to the other with the distance being the least at the end toward which the pairs of flanges face.

7. A telescopic protector for traversing screws and the like comprising a plurality of overlapping rings which progressively decrease in diameter from one end of the protector to the other end, an inwardly extending flange on the overlapping end of each ring, the inner diameter of said flange being substantially equal to the outside diameter of the next succeeding smaller ring, an outwardly extending flange on the underlapping end of each ring, said outwardly extending flange having an outer diameter substantially equal to the inner diameter of the next suceeding larger ring, and a set of three inwardly extending flanges fastened to the underlapping end of each ring, said last named flanges extending inwardly beyond their associated rings and being spaced apart around the periphery thereof.

8. A telescopic protector for traversing screws and the like comprising a plurality of overlapping rings which progressively decrease in diameter from one end of the protector to the other end, an inwardly extending flange on the overlapping end of each ring, the inner diameter of said flange being substantially equal to the outside diameter of the next succeeding smaller ring, an outwardly extending flange on the underlapping end of each ring, said outwardly extending flange having an outer diameter substantially equal to the inner diameter of the next succeeding larger ring, and a set of three inwardly extending flanges fastened to the underlapping end of each ring, said last named flanges extending inwardly beyond their associated rings and being spaced apart around the periphery thereof with flanges of each set being aligned with the flanges of the other sets, at least part of the aligned flanges in one row having guides at their inner ends, said last named guide including a pair of spaced flanges extending parallel to the axis of said screw and having a length greater than the pitch of the screw thread, said pairs of flanges bearing on said screw, the distance between the flanges of each pair varying from one end of the protector to the other with the distance being the least at the end toward which the pairs of flanges face.

References Cited in the file of this patent

UNITED STATES PATENTS

| | | |
|---|---|---|
| 859,637 | Adams | July 9, 1907 |
| 1,266,246 | Fulton | May 14, 1918 |
| 2,061,331 | Roberts | Nov. 17, 1936 |
| 2,151,421 | Davey | Mar. 21, 1939 |
| 2,514,721 | Roberts | July 11, 1950 |